United States Patent [19]

Shirasaki et al.

[11] 4,387,953
[45] Jun. 14, 1983

[54] OPTICAL WAVEGUIDE DEVICE WITH PHASE MATCHING LAYERS

[75] Inventors: Masataka Shirasaki, Kawasaki; Takeshi Obokata, Sagamihara, both of Japan

[73] Assignee: Fujitsu Limited, Kawasaki, Japan

[21] Appl. No.: 249,014

[22] Filed: Mar. 30, 1981

[30] Foreign Application Priority Data

Mar. 28, 1980 [JP] Japan ............... 55-40776
May 7, 1980 [JP] Japan ............... 55-60129
Aug. 30, 1980 [JP] Japan ............... 55-120192
Aug. 30, 1980 [JP] Japan ............... 55-120193

[51] Int. Cl.³ ............................... G02B 5/172
[52] U.S. Cl. .................... 350/96.14; 350/96.13
[58] Field of Search ............ 350/96.12, 96.13, 96.14, 350/96.34, 164

[56] References Cited

U.S. PATENT DOCUMENTS

| | | | |
|---|---|---|---|
| B 540,872 | 1/1976 | van der Ziel | 307/88.3 |
| 3,464,762 | 9/1969 | Kahng | 350/356.1 |
| 3,765,773 | 10/1973 | Weiner | 356/364 |
| 3,856,379 | 12/1974 | Burns et al. | 350/96.13 |
| 3,923,374 | 12/1975 | Martin | 350/96.12 |
| 4,032,217 | 6/1977 | Coeuré et al. | 350/96.12 |
| 4,047,801 | 9/1977 | Challeton et al. | 350/96.31 |
| 4,089,582 | 5/1978 | Mahlein et al. | 350/96.13 |
| 4,337,990 | 7/1982 | Fan et al. | 350/1.7 |

Primary Examiner—John D. Lee
Assistant Examiner—Frank Gonzalez
Attorney, Agent, or Firm—Staas & Halsey

[57] ABSTRACT

An optical waveguide device is disclosed, which includes an optical waveguide member having a predetermined length and thickness, the thickness is far smaller than the length. The optical waveguide member is covered, on it's top and bottom surfaces, by phase-matching layers. The phase-matching layers function to substantially decrease the difference (dΔ) between the phase shift ($\delta_p$) of a P polarized light component and the phase shift ($\delta_s$) of a S polarized light component, included in light to be transmitted through the optical waveguide member. The phase shift is created every time a reflection takes place on the top and bottom surfaces thereof.

21 Claims, 17 Drawing Figures

Fig. 7
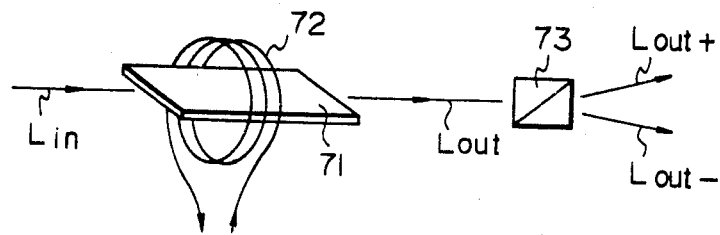
Fig. 8
Fig. 9
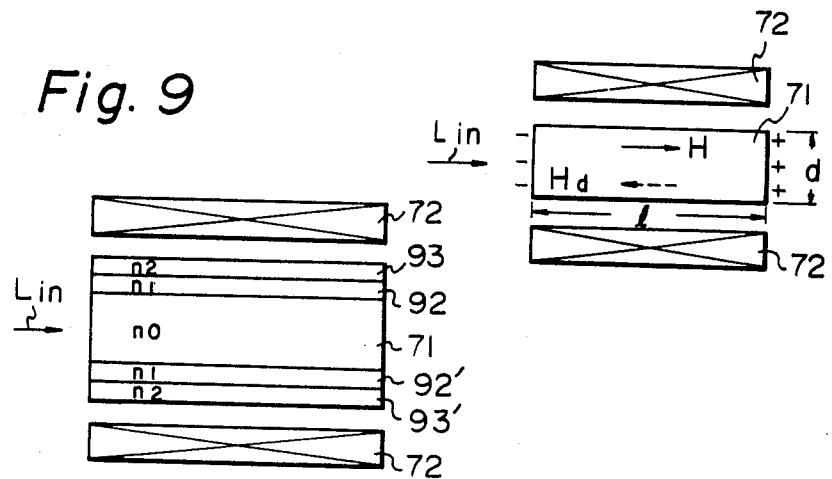
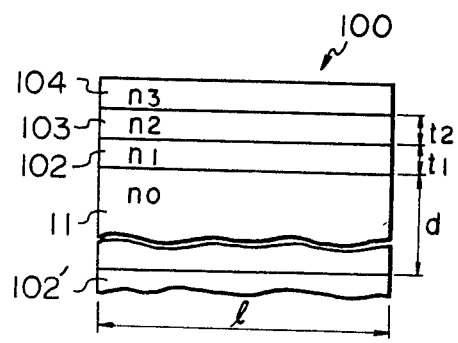
Fig. 10

OPTICAL WAVEGUIDE DEVICE WITH PHASE MATCHING LAYERS

BACKGROUND OF THE INVENTION

The present invention relates to an optical waveguide device, and more particularly to an optical waveguide device having an transparent waveguide member.

In, for example an optical communication system, the optical waveguide device is one of the most important members comprising the system, because, the optical waveguide device is used to make an optical switch, an optical modulator, an optical isolator or an optical circulator. Especially, the present invention refers to a device comprising an electro-optic crystal, or a device comprising a magneto-optic crystal.

As is widely known, the optical waveguide device made of the electro-optic crystal or the magneto-optic crystal is utilized for switching a plane of polarization so as to switch the optical path as a non-mechanical transducer. Generally, a mechanical switch, having the same function for switching light paths, produces a disadvantage in that it is difficult to increase the reliability and also achieve a high speed switching operation. However, the above mentioned non-mechanical switch does not produce such disadvantages.

The optical waveguide device made of the electro-optic crystal can change its plane of polarization by 90° or 0° depending upon whether or not an external electric field is applied thereto. Similarly, the optical waveguide device, made of the magneto-optic crystal can change its plane of polarization by +45° or −45° when an external magnetic field is applied in a forward direction or a reverse direction. Regarding the electro-optic crystal, it is preferable to reduce the thickness thereof to be as small as possible so as to obtain a high electric field strength created therein. Similarly, regarding the magneto-optic crystal, it is preferable to reduce the thickness thereof to be as small as possible so as to decrease the demagnetizing field induced therein and, accordingly, obtain a high magnetic field strength created therein. However, it is very important to notice that when the thickness of the transducing crystal is reduced to be as small as possible, the function of changing the plane of polarization can no longer be maintained with a high degree of accuracy. That is, for example, deleterious crosstalk is generated in the crystal. Briefly the reason for this is as follows. When the crystal is made small in thickness, for example 50 μm, light, to be propagated in the crystal cannot pass therethrough without abutting against the walls thereof. Thus, the light passes through the crystal while reflecting off the wall repeatedly. In this case, a phase shift induced by the occurrence of each reflection of a reflected P polarized light component is not the same as a phase shift of a reflected S polarized light component. As is known by persons skilled in the art, the P polarized light component is a parallel component with respect to a plane along which the light runs in an electric field direction. However, the S polarized light component is perpendicular to the above mentioned plane. Since, as mentioned above, the amount of the phase shift of the reflected P polarized light component is not the same as that of the reflected S polarized light component, the light to be propagated in the crystal cannot pass therethrough without changing its polarization state, which is defined by the combination of both the P and S polarized light components. In such a case, the light output from the crystal cannot be accurately polarized and, thus, the previously mentioned deleterious crosstalk is produced thereby.

SUMMARY OF THE INVENTION

It is an object of the present invention to provide an optical waveguide device which, even though the thickness of the device is made very small, produces almost no deleterious crosstalk.

BRIEF DESCRIPTION OF THE DRAWINGS

The present invention will be more apparent and better understood from the following detailed description in conjunction with the accompanying drawings, in which:

FIG. 7 illustrates an application of a conventional optical waveguide apparatus including a magneto-optic crystal;

FIG. 8 illustrates a cross-sectional of the members 71 and 72 shown in FIG. 7, used for explaining the operational principle of the magneto-optic crystal;

FIG. 9 illustrates a cross-sectional view of the optical waveguide device, including a magneto-optic crystal, based on the first embodiment (FIGS. 4, 5, 6A and 6B) of the present invention;

FIG. 10 illustrates a cross-sectional view, partially cut off, of an optical waveguide device according to a second embodiment of the present invention;

DESCRIPTION OF THE PREFERRED EMBODIMENTS

Figure 1:
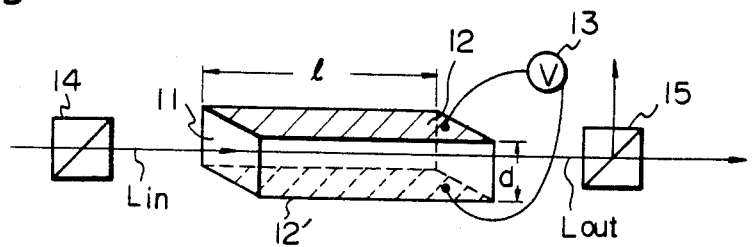
FIG. 1 illustrates of a conventional optical waveguide apparatus including the electro-optic crystal.

FIG. 1 is a schematic view of a conventional optical switch including the electro-optic crystal. In this figure, the reference numeral 11 represents a transparent waveguide member, 12 and 12' represent electrodes mounted on the top and bottom surfaces of the member 11, 13 a power source (V), 14 and 15 represent, respectively a polarizer and an analyzer. The member 11 is specifically an electro-optic crystal, and the polarizer 14 and the analyzer 15 are specifically prisms. The member 11 can change a polarization plane by 90° or 0° selectively when an external voltage V is supplied from the power source 13 and applied onto the electrodes 12 and 12' and vice versa. In this case, the function of changing the plane of polarization can be more effective than usual by first shortening the thickness d of the member 11, second enlarging the length l thereof and third increasing the voltage level of the power source 13 connected to the electrodes 12 and 12'. It should be recognized that said function of changing the plane of polarization can be improved by increasing the strength of the electric field (E) to be induced in the member 11, in which the electric field E is generally expressed by an equation $E = V/d$. Accordingly, the value E may be increased by shortening the thickness d and/or increasing the level of the voltage V. On the other hand, it is also useful to increase the length l. This is because, the longer the length l becomes, the greater the influence on the polarization of the light becomes.

In general, it is preferable to operate the member 11 at a low level of voltage V, from an economical view point. However, if the level of the voltage V is to be decreased, without reducing the function of polarization, the ratio of l/d must be larger than usual, for example the thickness d should be 200 μm and the length l should be 2 cm. Accordingly, the light $L_{in}$ can usually pass through the member 11 without abutting against the top and bottom surfaces thereof toward the output surface of the member. In other words, the light $L_{in}$ can usually pass through the member 11 without creating any reflection on the top or bottom surfaces. However, if the ratio of l/d is increased, for example, so that d=200 μm and l=2 cm, it is almost impossible for the light $L_{in}$ to pass through the member 11 without creating a reflection on the top and bottom surface thereof. This is because, the light $L_{in}$ generally has characteristics such that the width of the beam of the light $L_{in}$ is gradually and slightly enlarged during the transmission of the light along the light path in the member 11. In this case, as previously mentioned, the respective phase shifts are created in the reflected P and S polarized light components. To make the matter worse, the amount of the phase shift of the P and S polarized light components are not the same and, therefore, the output light from the output surface of the member 11 cannot accurately be polarized. The difference between the above mentioned phase shifts will be clarified with reference to FIG. 2.

Figure 2:
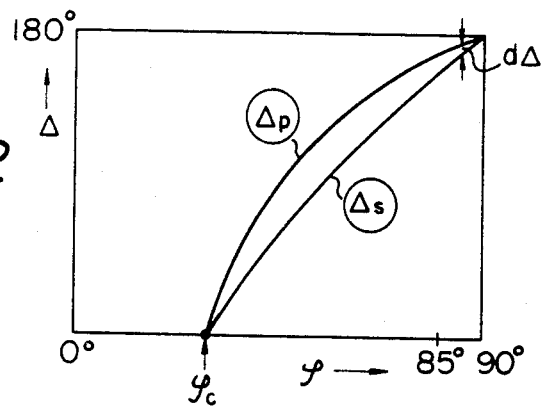
FIG. 2 is a graph depicting a relationship between an incidence angle $\varphi$ and a phase shift $\Delta$ caused by reflection.

FIG. 2 is a graph depicting a relationship between an incidence angle φ and a phase shift Δ. In the graph, the ordinate indicates the phase shift Δ between the phase of the incident light and the phase of the reflected light, with respect to the P and S polarized light components. The abscissa indicates the incidence angle φ, with respect to the P and S polarized light components. A curve $\Delta_p$ indicates the characteristics of the P polarized light component and a curve $\Delta_s$ indicates the characteristics of the S polarized light component. As seen from the graph, the amount of the phase shifts $\Delta_p$ and $\Delta_s$ are not the same, except in those cases where the incidence angle φ is 90° or a critical angle $\varphi_c$. Thus, there is a difference dΔ between the phase shifts $\Delta_p$ and $\Delta_s$. In, the optical communication system, for example, the light L (FIG. 1) is usually restricted to project onto the input surface of the member 11 (FIG. 1) at about a right angle to the input surface and, accordingly the incidence angle φ of the light L with respect to the top or bottom surface may be near 90° or varies between about 85° and 90°. In this range of incidence angles φ, the difference dΔ between the phase shifts may be very small. However, when the ratio of l/d is selected to be large, as is done in the present invention, the reflections of the light L between the top and bottom surfaces may occur many times while the light L travels through the member 11. Thus, the accumulated difference dΔ will finally become very large, which means that an accurate polarization cannot be expected.

Figure 3:
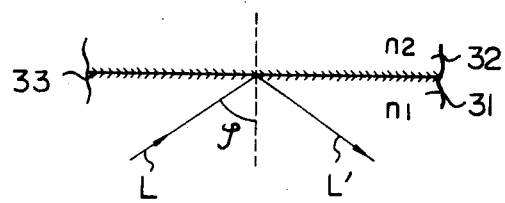
FIG. 3 is a diagram illustrating a light path under a total reflection mode and is used for explaining phase shifts induced in the P and S polarized light components.

FIG. 3 is a diagram showing a light path under a total reflection mode, used for explaining phase shifts induced in the P and S polarized light components. In this figure, a layer 31 having a refractive index of n1 and a layer 32 having a refractive index of n2, are attached to each other via a boundary face 33. The light L is projected onto the boundary face 33 at the incidence angle φ, under the total reflection mode, and the reflected light L' is obtained. The phase shift $\Delta_p$, between the P polarized lights L and L', and the phase shift $\Delta_s$, between the S polarized light L and L', are expressed by the following equation (1).

$$\tan \frac{\Delta p}{2} = - \frac{\sqrt{\sin^2 \rho - \sin^2 \rho_0}}{\sin^2 \rho_0 \cdot \cos \rho} \\ \tan \frac{\Delta s}{2} = - \frac{\sqrt{\sin^2 \rho - \sin^2 \rho_0}}{\cos \rho} \quad (1)$$

(where, $\sin \varphi_0 = n2/n1$)

Figure 4:
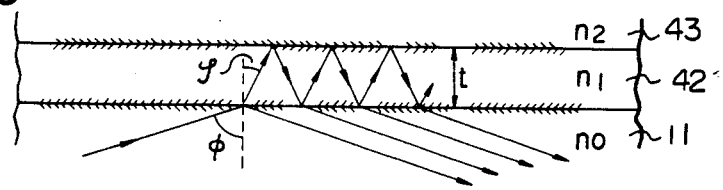
FIG. 4 illustrates a cross-sectional view of a first embodiment according to the present invention.

Further, an arrangement of multi-layers, shown in FIG. 4, should also be taken into consideration. FIG. 4 is a cross-sectional view of a first embodiment according to the present invention. In FIG. 4, a layer 42 having a refractive index of n1 and a thickness of t, is attached onto the transparent waveguide member 11 having a refractive index of n0 and, further a layer 43 having a refractive index of n2 is mounted on the layer 42. Furthermore, the refractive indexes n0, n1 and n2 are chosen so as to satisfy the following inequality.

$n2 < n0 < n1$

In FIG. 4, since the inequality of n2 < n0 stands, the light, travelling in the layer 42, is reflected by the layer 43. In this some of the light, travelling in the layer 11, has a light path which is longer than usual because of an additional light path. The additional light path is created in the layer 42 by the reflection from the layer 43. Consequently, the above mentioned phase shift Δ (regarding both the phase shifts $\Delta_p$ and $\Delta_s$) is modified to be a phase shift Δ' due to the presence of said additional light path. The modified phase shift Δ' is expressed by the following equation (2), provided that the plane having the same phase is created in a plane being perpendicular to a direction in which the light travels.

$$\Delta' = 2\pi \left\{ \frac{2t}{\cos \varphi} \bigg/ \frac{\lambda}{n1} - 2t \tan \varphi \sin \varphi \bigg/ \frac{\lambda}{n0} \right\} \quad (2)$$

(where the symbol $\lambda$ denotes the wavelength of the light, the symbol $\varphi$ denotes the incidence angle (refer to FIG. 4).)

Then the following equation (3) is obtained when the well-known relationship, that is $n0 \sin \varphi = n1 \sin\varphi$, is substituted in the equation (2).

$$\Delta' = \frac{4\pi t\, n1}{\lambda} \cos \varphi \quad (3)$$

It should be recognized that since the relationship $\pi/2 - \varphi <<$, exists (as previously mentioned, the incidence angle is within a range between about 85° and 90° ($\pi/2$)), the elements $\tan \varphi$, $\cos \varphi$ and $\sin \varphi$ of the equation (2) are considered to be constant values by an approximation of a first order equation.

Now, a phase shift $\delta_p$ and a phase shift $\delta_s$ are defined. The phase shift $\delta_p$, with respect to the P polarized light component, is a composite value of both the phase shift $\Delta_p$ of the equation (1) and the modified phase shift $\Delta'$ of the equation (3). Similarly, the phase shift $\delta_s$, with respect to the S polarized light component, is a composite value of both the phase shift $\Delta_s$ of the equation (1) and the modified phase shaft $\Delta'$ of the equation (3). These values $\delta_p$ and $\delta_s$ are determined only by the values of n0, n1, n2 and t, in a case where the expression, $\varphi \div \pi/2$, exist With respect to a reflection coefficient r, a reflection coefficient $r_p$ of the P polarized light component and a reflection coefficient $r_s$ of the S polarized light component, are expressed by the following equation (4).

$$\left. \begin{array}{l} r_p = \frac{\tan (\varphi - \varphi)}{\tan (\varphi + \varphi)} \\ \\ r_s = - \frac{\sin (\varphi - \varphi)}{\sin (\varphi + \varphi)} \end{array} \right\} \quad (4)$$

The incidence angle $\varphi$ can be expressed by the equation, $$\varphi = \frac{\pi}{2} - \theta \quad (\theta << 1),$$

by introducing a variable $\theta$. Then equation (4) can be rewritten into the following expression (5), when the subsequent terms of the progression series of the variable $\theta$ are abbreviated and only the first term thereof is used.

$$\left. \begin{array}{l} r_p \approx -1 + \frac{2\theta}{\sin \rho \cos \varphi} = -1 + K_p\theta \\ \\ r_s \approx -1 + 2\theta \tan \varphi = -1 + K_s\theta \end{array} \right\} \quad (5)$$

The symbols Kp and Ks denote proportional coefficients and can be determined by a ratio of n0/n1.

The above recited equations and expressions correspond to the case, where a single additional light path exists in the layer 42 of FIG. 4. However, actually, such additional light paths exist repeatedly and continuously many times in the layer 42. Accordingly, the total reflected light, which is produced via such continuous additional light paths, should actually be considered. The amplitude A of such total reflected light can be expressed by the following equation (6), provided that incident light having an amplitude of 1 is projected onto the layer 42 (FIG. 4).

$$\begin{aligned} A &= r + (1 - r^2)e^{i\delta} + (1 - r^2)(-r)e^{2i\delta} + \\ &\quad (1 - r^2)(-r)^2 e^{3i\delta} + \ldots \\ &= r + (1 - r^2)e^{i\delta}[1 + (-r)e^{i\delta} + (-r)^2 e^{2i\delta} + \ldots ] \\ &= r + \frac{1 - r^2}{r + e^{-i\delta}} \end{aligned} \quad (6)$$

(Where, the symbol $\delta$ denotes both the phase shifts $\delta_p$ and $\delta_s$, representatively, i denotes an imaginary part and e denotes a base of a natural logarithm.)

The amplitude A, expressed by a complex number, of the total reflected light can be rewritten into the following equation (7), through a rationalization of the complex number A.

$$A = \frac{2r + (1 + r^2)\cos \delta + i(1 - r^2)\sin \delta}{1 + r^2 + 2r \cos \delta} \quad (7)$$

Then, the phase angle of A, that is $\tan \xi$ (corresponding to the ratio between the real part of the complex number and the imaginary part thereof), can be expressed by the following equation (8), provided that the value $(K\theta - 1)$ (k is a representative of both $k_p$ and $k_s$) is substituted for the value r in equation (7) and also the item $k^2\theta^2$ is abbreviated, because it is very small.

$$\tan \xi = \frac{K \sin \delta}{(K\theta - 1)(1 - \cos \delta)} \quad (8)$$

As previously mentioned, regarding the equation (5), the variable $\theta$ is expressed as $\theta << 1$. Therefore, the equation (8) is rewritten to be the following expression (9).

$$\tan \xi \approx \frac{K \sin \delta}{\cos \delta - 1} \cdot \theta \quad (9)$$

Returning to the graph of FIG. 2, the difference $d\Delta$ should be as small as possible and approaching zero within at least in a range between 85° and 90°. In other words, the value of the phase shifts $\Delta_p$ ($\delta_p$) and $\Delta_s$ ($\delta_s$) should be the same, so as to avoid the occurrence of deleterious crosstalk. Thus, the value of $\tan \xi$, regarding the P polarized light component, that is $$\frac{K_p \sin \delta_p}{\cos \delta_p - 1} \cdot \theta$$

(see the equation (9)), must be the same as the value of $\tan \delta$, regarding the S polarized light component, that is $$\frac{K_s \sin \delta_s}{\cos \delta_s - 1} \cdot \theta$$

Consequently, the following equation (10) rejects.

$$\frac{K_p}{K_s} = \frac{\sin \delta_s (1 - \cos \delta_p)}{\sin \delta_p (1 - \cos \delta_s)} \quad (10)$$

Figure 5:
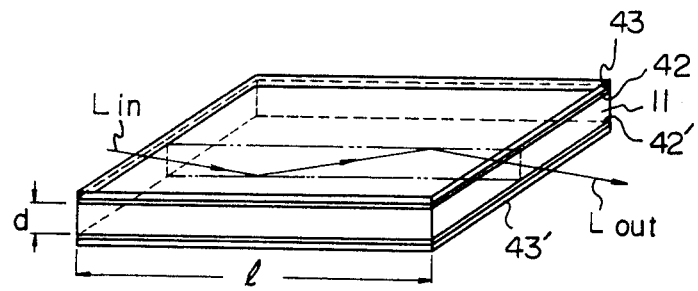
FIG. 5 illustrates a perspective view of the optical waveguide device according to the first embodiment of the present invention.
Figure 6A:
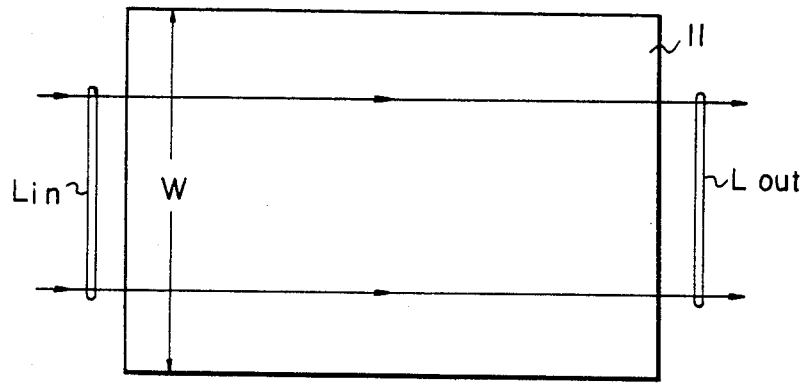
FIG. 6A illustrates a plan view of the optical waveguide device shown in FIG. 5.
Figure 6B:
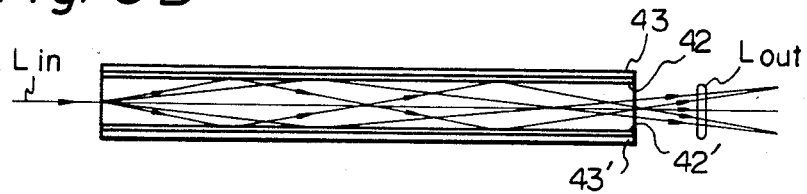
FIG. 6B illustrates a side view of the optical waveguide device shown in FIG. 5.

In equation (10), the left term $$\frac{K_p}{K_s}$$

is determined by the ratio n0/n1 and the right term is determined by n0/n1, n2/n1, n, t. Accordingly, equation (10) can easily be satisfied by selecting respective values. For example, $n0 = 2.2$ $n1 = 2.6$ $n2 = 2.15$ $\lambda = 1.3 \ \mu m$ $t = 3615 \ \text{Å}$ Thus, according to the first embodiment of the present invention, at least two transparent layers 42 and 43 are coated, as phase-matching layers, on the transparent waveguide member 11 and, at the same time, the values n0, n1, n2 and t are suitably chosen so as to satisfy the equation (10). FIG. 5 is a perspective view of the optical waveguide device according to the first embodiment of the present invention. The members which are represented by the same reference numerals or symbols as those of FIGS. 1, 3 and 4, are identical to each other. The reference symbols $L_{in}$ and $L_{out}$ represent, respectively, input light and output light to be polarized or not, under control of the external voltage V (not shown in FIG. 5 but shown in FIG. 1). FIG. 6A is a plan view of the optical waveguide device shown in FIG. 5. FIG. 6B is a side view of the optical waveguide device shown in FIG. 5. As seen from FIG. 6A, the width W of the member 11 can freely be selected and, accordingly, a belt-like input light $L_{in}$ can be used, where the light will not abut against the side walls of member 11. Contrary to this, as seen from FIG. 6B, since the ratio l/d is selected to be large, the light is reflected from the top and bottom surfaces many times while the light travels through the member 11. However, as previously mentioned; the output light $L_{out}$ can accurately be polarized even though the light is reflected many times, and simultaneously the level of the voltage V can be considerably reduced because the thickness d is selected to be very small compared to the prior art device.

The above mentioned theorem can also be applied to another type of optical waveguide device. FIG. 7 is a schematic of a present optical waveguide apparatus including a magneto-optic crystal. In this figure, the reference numeral 71 represents a transparent waveguide member, the magneto-optic crystal 72 represents an electromagnetic coil which generates a magnetic field to be applied to the member 71, and 73 represents an analyzer, such as a prism. The member 71 can change it's plane of polarization by +45°, or by −45° when the magnetic field is reversed. Thus, an output light $L_{out+}$ or an output light $L_{out-}$ is polarized as the input light $L_{in}$. These output lights $L_{out+}$ and $L_{out-}$ differ in polarization from each other by 90°.

FIG. 8 is a cross-sectional schematic view of the members 71 and 72 shown in FIG. 7, used for explaining the operational principle of the magneto-optic crystal. In FIG. 8, the magnetic field H is induced, by the coil 72, in the member 71 having the length of l and the thickness d. It should be recognized that the function of changing the plane of polarization can be strengthened by increasing the strength of the magnetic field H. However, generally when the magnetic field H is induced, a demagnetizing field Hd is induced, opposite to the original magnetization. The symbols + and − represent magnetic poles for inducing the field Hd. In this case, a well known equation (11) exists.

$$Hd = N \cdot M \quad (11)$$

(Where the symbol N denotes the demagnetizing factor and M denotes magnetization of the magneto-optic crystal.)

As understood from the equation (11), if the value N (0 < N < 1) is large, the field Hd is also large. Consequently, the effective magnetic field (H-Hd) is reduced to some extent. Therefore, it is necessary to reduce the value N so as to increase the strength of the effective magnetic field (H-Hd). In such circumstances, it is also a well known fact that the value N can be reduced toward zero by increasing the ratio l/d. Thus, the length l is enlarged and the thickness d is decreased, so that the ratio l/d may be increased. In this case, the length l is not selected at random, because the length l is defined by a wavelength of light passing through the crystal. If the crystal is made of YIG (Yttrium Iron Garnet) and light having a wavelength of 1.3 µm is used, the length l is limited to 2 mm. Then, the thickness d must be less than 60 µm, so as to make the value N almost zero.

Since the thickness d must be selected to be very small, a problem, which is similar to the above mentioned problem of the deleterious crosstalk, also arrises in the device 71 of FIG. 7.

Under such circumstances, the above mentioned phase-matching layers, such as, the layers 42, 42′, 43 and 43′, will also be very effective for solving the above mentioned problem. Thus, the arrangement shown in FIG. 9 is preferable for the device 72. FIG. 9 is a cross-sectional view of the optical waveguide device, including the magneto-optic crystal, based on the first embodiment (FIGS. 4, 5, 6A and 6B) of the present invention. In this figure, the members 71 and 72 have already been explained with reference to FIG. 8. Members 92, 93, 92′ and 93′ are phase-matching layers which are functionally similar to, respectively the phase-matching layers 42, 43, 42′ and 43′ shown in FIG. 6B according to the first embodiment. The layers 92 and 92′ have the same refractive index as n1, the layers 93 and 93′ have the same refractive index as n2, and the thickness (t) of these layers and the refractive indexes (n) satisfy the above recited equation (10). Thus, the device 71, which can be driven by a low strength magnetic field, is realized by decreasing the thickness d thereof, without producing deleterious crosstalk. In the prior art, it is necessary to induce the magnetic field H to about 2,500 Oe(Oerded) in the magneto-optic crystal, comprising a 45°-Faraday effect element. Contrary to this, according to the device shown in FIG. 9, the magnetic field can be reduced to about 100 Oe, in which the length l is 2 mm, the thickness d is 60 µm and light having a wavelength of 1.3 µm is used.

FIG. 10 is a cross-sectional view, partially cut off, of an optical waveguide device according to a second embodiment of the present invention. The device 100 has three phase-matching layers on each of the top and bottom surface of transparent waveguide member 11. The transparent waveguide member 11 may be the electro-optic or magneto-optic crystal. The three phase-matching layers are represented by the reference numerals 102 (102'), 103 and 104. The layers 102, 103 and 104 have refractive indexes of n1, n2 and n3, respectively. The refractive index of the member 11 is n0. In the second embodiment, the refractive indexes n0~n3 are defined so as to satisfy the following inequalities (12) and (13).

$$n1 < n0 < n2 \quad (12)$$

$$n3 < n0 < n2 \quad (13)$$

(The relationship between n1 and n3 is free.) At the same time, the above recited equation (10) must also be satisfied. Taking as one example a case where the YIG crystal (having the refractive index as n0 being equal to 2.2) is employed as the transparent waveguide member 11, the layers 102 and 104 are made of $SiO_2$ (having refractive indexes (n1, n3) being equal to 1.45). The layer 103 is made of SiH (having the refractive index of n2 being equal to 3.4). Further, the thicknesses t1 and t2 of the layers 102 and 103 should be 1260 Å and 1750 Å, respectively, and the length l is 2 mm and the thickness d is 60 μm. The length l of 2 mm is suitable for light having a wavelength of about 1.3 μm. Regarding the layer 103, the refractive index as n2 can be adjusted at will by slightly varying an amount of additional H added to SiH. The second embodiment has an advantage in that such a device as shown in FIG. 10 can freely cope with variations of wavelength of the light to be transmitted through the member 11. This is because, in the design of the device, the designer is allowed to select suitable values from four variables, that is n1, n2, t1 and t2. Thus, it is easy for the designer to determine the structure of the device with respect to various values of the wavelengths.

Figure 11:
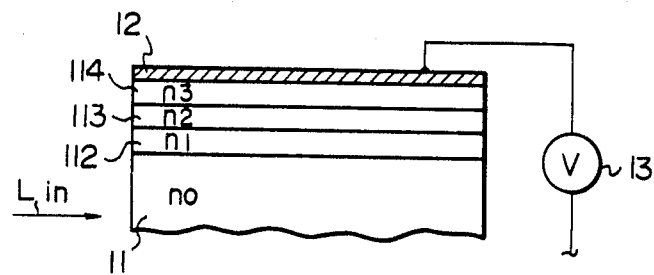
FIG. 11 illustrates a cross-sectional view, partially cut off, of an optical waveguide device including the electro-optic crystal according to the present invention.
Figure 15:
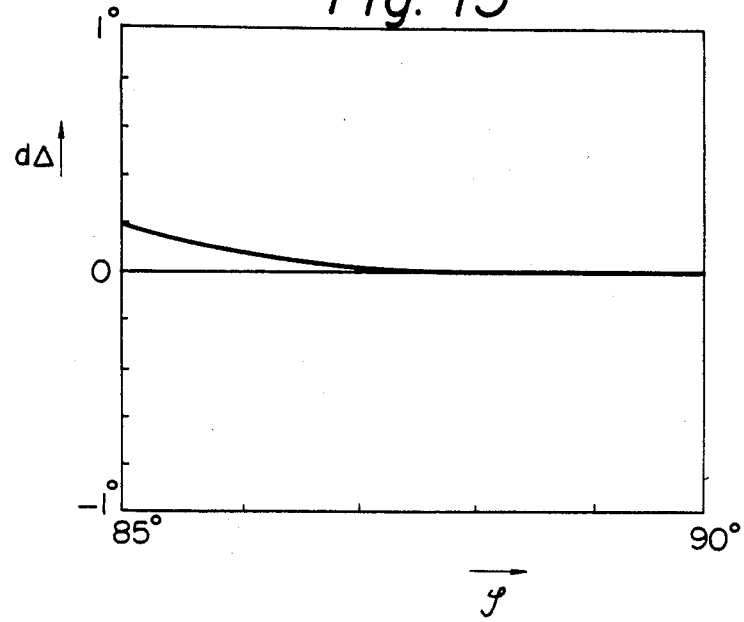
FIG. 15 a graph depicting a relationship between an incidence angle $\varphi$ and a phase shift $\Delta$ of the second embodiment.

The above mentioned second embodiment can also be applied to the optical waveguide device including the electro-optic crystal. It should be noted that FIG. 10 illustrates such a device including the magneto-optic crystal. FIG. 11 is a cross-sectional view, partially cut off, of an optical waveguide device, including the electro-optic crystal, according to the present invention. In this figure, the members 11, 12 and 13 have already been explained. The reference numerals 112, 113 and 114 represent phase-matching layers which correspond respectively to the layers 102, 103 and 104 shown in FIG. 10. The layers 112, 113 and 114 must also satisfy the conditions relating to the above recited equation (10) and the expressions (12) and (13), so as to produce an advantage similar to the aforesaid advantage with reference to FIG. 10. Taking as one example, the member 11 is made of $Bi_{12}SiO_{20}$, the layer 112 is made of $SiO_2$ (thickness is greater than 1300 Å), the layer 113 is made of SiH (thickness is 1835 Å) and the layer 114 is made of $SiO_2$ (thickness is 940 Å). And a relationship between an incidence angle φ and a difference of a phase shift $d\Delta = (\Delta p - \Delta s)$ is as shown in FIG. 15.

However, according to the structure shown in FIG. 11, a certain problem rises. The problem is that an electric field, having a desired level, is not induced in the crystal 11. This is because, two dielectric material members, that is the layers 112 and 114, are inserted between the electrode 12 and the crystal 11. In such an arrangement, the electric field to be induced in the crystal 11 is initially large, however, the electric field is gradually reduced to a certain low level, which phenomenon is referred as drift. The time constant of the drift is defined by CR, where the symbols C and R denote a capacitance and a leakage resistance developed across phase matching films (12') and the crystal 11. Thus, if substantial drift occurs, the crystal 11 cannot be supplied by an electric field which is high enough to cause the polarization therein after a certain time (=CR) has passed. In order to eliminate such drift, the present invention provides such an arrangement in that the crystal 11 is covered, on its top and bottom surfaces, by conductive phase-matching layers, both acting as the electrodes (12, 12'). Alternately, the crystal 11 is covered by the electrodes (12, 12') via conductive phase-matching layer or phase-matching layers, each having relatively low resistance values.

Figure 12:
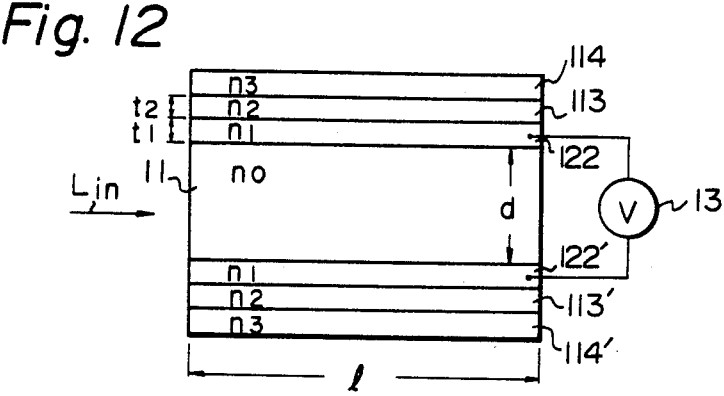
FIG. 12 illustrates a side view of an optical waveguide device according to a third embodiment of the present invention.

FIG. 12 is a side view of an optical waveguide device according to a third embodiment of the present invention. The third embodiment, illustrated in FIG. 12, can solve the aforesaid problem of drift. In this figure, layers 122 and 122' are the conductive phase-matching layers to be connected to the power source 13. Since no dielectric material member exists between each electrode and the crystal 11, the drift cannot occur. It is true that the layers 122 (122'), 113 (113') and 114 (114') must satisfy, at the same time, the above recited equation (10) and the expressions (12) and (13). Taking as one example, the crystal 11 is made of $Bi_{12}SiO_{20}$ (having a refractive index (n0) bein equal to 2.4) (it is also possible to use ZnTe as the crystal 11 which has a refractive index of 3.0), the phase-matching layer 113 is made of SiH (having a refractive index (n2) of 3.5), the phase-matching layer 114 is made of $SiO_2$ (having a refractive index (n3) of 1.45) and the conductive phase-matching layer 122 is made of $In_2O_3$ (or $SnO_2$) (having a refractive index (n1) of 2.0). The layer 122 is a transparent material. Further, the length l is about 2 cm, the thickness d is about 60 μm, the thickness t1 is 2600 Å and the thickness t2 is 1100 Å.

As previously mentionied, the conductive phase-matching layers 122 are not limited to being connected directly to the crystal 11, but the second or more layers counted away from the crystal 11, may be used as the conductive phase-matching layers. In the latter case, the conductive phase-matching layers must be electrically connected to the crystal 11 via other phase-matching layers, each having a relatively low resistance value.

The phase-matching layer of the present invention is effective not only for an optical waveguide member which is made of isotropic material, but also an optical waveguide member which is made of anisotropic material. The anisotropic optical waveguide member provides a characteristic of double refraction (birefringence). In this case, the value of the refractive index, with respect to P polarized light component, is different from that of the S polarized light component. However, the phase-matching layer of the present invention has the ability to eliminate the aforementioned crosstalk by suitably determining the relative refractive indexes between the optical waveguide member and the phase-matching layer.

Figure 13:
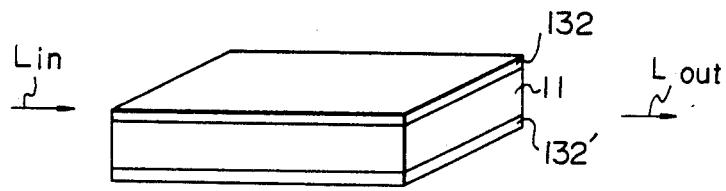
FIG. 13 illustrates a perspective view of an optical waveguide device according to a fourth embodiment of the present invention.

FIG. 13 is a perspective view of an optical waveguide device according to a fourth embodiment of the present invention. In this figure, the reference numerals 132 and 132' represent phase-matching layers to be mounted on the top and bottom surfaces of the optical waveguide member 11 which is made of the anisotropic material.

The aforesaid crosstalk can be eliminated by compensating for the aforesaid phase shift. The phase shift can be compensated for by suitably determining the values of the refractive indexes in such a manner that a relative refractive index $n21_s$ with respect to the S polarized light component is larger than a relative refractive index $n21_p$ with respect to the P polarized light component. The relative refractive index $n21_s$ means a ratio of the refractive index $n1_s$ of the member 11 with respect to the refractive index $n2$ of the layer 132 (132'), that is $n21_s = n1_s/n2$. On the other hand, the relative refractive index $n21_p$ means a ratio of the refractive index $n1_p$ of the member 11 with respect to the refractive index $n2$ of the layer 132 (132'), that is $n21_p = n1_p/n2$. This will be recognized by the fact that the refractive index of the so-called ordinary ray, which is the S polarized light component to be projected onto the input surface of the member 11 at a right angle, is larger than the refractive index of the so-called extraordinary ray which corresponds to the P polarized light component. If the index $n21_s$ is larger than the index $n21_p$, the phase shifts $$\tan\frac{\Delta_p}{2} \text{ and } \tan\frac{\Delta_s}{2}$$

(both shown in the above recited equation (1)) are almost equal to each other within the range of $85° \leq \varphi \leq 90°$. The above mentioned fact will further be clarified with reference to FIG. 14.

Figure 14:
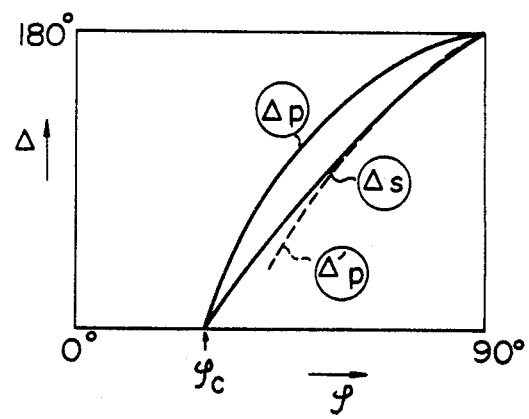
FIG. 14 is a graph depicting a relationship between an incidence angle $\varphi$ and a phase shift $\Delta$ of the fourth embodiment.

FIG. 14 is a graph depicting the relationship between an incident angle $\varphi$ and a phase shift $\Delta$. This graph is similar to the graph of FIG. 2. According to the theorem, explained with reference to FIG. 2, the difference $d\Delta$ between the phase shifts $\Delta_p$ and $\Delta_s$ is made almost zero by subjecting the layers to the above recited equation (10). Contrary to this, according to the fourth embodiment, the difference $d\Delta$ is reduced to almost zero by shifting the curve $\Delta_p$ toward the right so as to coincide with the curve $\Delta_s$ within the range of $85° \leq \varphi \leq 90°$. In the graph of FIG. 14, the original curve $\Delta_p$ is shifted to be a curve $\Delta'_p$, indicated by a dotted line. This can be realized by satisfying the aforesaid condition, that is $n21_s > n21_p$. Thus, the difference $d\Delta$ of FIG. 13 can be reduced to be almost zero when the angle $\varphi$ exists within the range, that is $85° \leq \varphi \leq 90°$.

Figure 16:
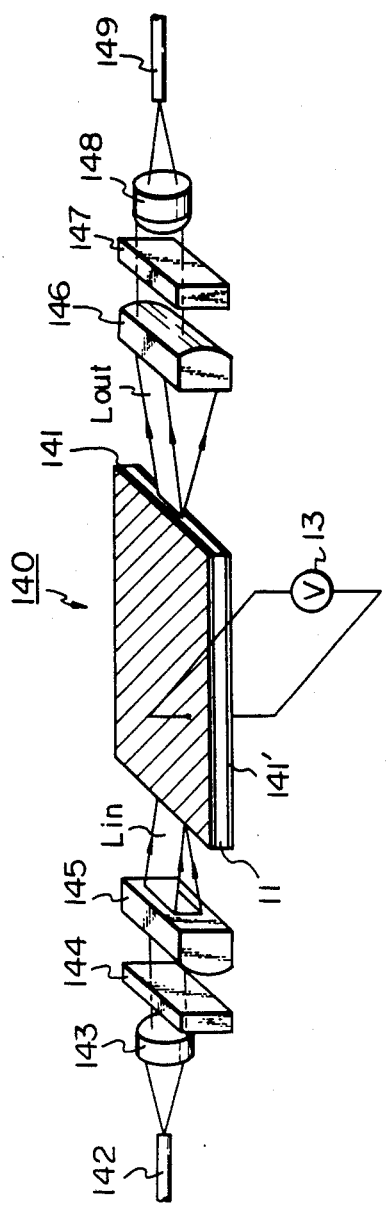
FIG. 16 illustrates an optical waveguide apparatus including the optical waveguide device according to the present invention.

FIG. 16 is a total perspective view of an optical waveguide apparatus including the optical waveguide device according to the present invention. In FIG. 16, the optical waveguide device 140 is illustrated, taking as an example the electro-optic crystal. The members 11, 12 and 13 have already been explained. The reference numerals 141 and 141' indicate the phase-matching layers of the present invention. The symbols $L_{in}$ and $L_{out}$ are input light and output light, respectively. The input light $L_{in}$ is supplied from an optical fiber 142, via a plano-convex lens 143 and a polarizer 144, a cylindrical (or semi-cylindrical) lens 145. On the other hand, the output light $L_{out}$ is illuminated onto an optical fiber 149, via a cylindrical (or semi-cylindrical) lens 146, an analyzer 147 and a plano-convex lens 148.

We claim:

1. An optical waveguide device, comprising:
an optical waveguide member having a predetermined length and thickness, the thickness being far smaller than the length, said optical waveguide device operating so that light to be processed is illuminated onto an input surface of the optical waveguide member, the light issuing from an output surface, and the light travelling from the input surface to the output surface with a plurality of reflections from top and bottom surfaces of said optical waveguide member; and
phase-matching layers mounted on each of the top and bottom surfaces of the optical waveguide member, the phase-matching layers functioning to substantially decrease the difference between a first phase shift of a first polarized component of the light and a second phase shift ($\delta_s$) of a second polarized component of the light each phase shift being created every time each of said reflections takes place.

2. A device as set forth in claim 1, wherein three phase-matching layers are mounted on each of the top and bottom surfaces of the optical waveguide member, a first phase-matching layer mounted on the top and bottom surfaces of the optical wave guide member, a second phase-matching layer mounted on the first phase-matching layer and a third phase-matching layer mounted on the second phase-matching layer, having refractive indexes n1, n2 and n3, respectively, said indexes satisfying the condition that $n1 < n0 < n2$ and $n3 < n0 < n2$, where n0 denotes the refractive index of the optical waveguide member.

3. A device as set forth in claim 2, wherein the optical waveguide member is selected from the group consisting of glass, an electro-optic crystal and a magneto-optic crystal.

4. A device as set forth in claim 3, wherein the optical waveguide member comprises an electro-optic crystal to which an external voltage is applied via a pair of electrodes.

5. A device as set forth in claim 4, wherein the first phase-matching layer mounted on the top and bottom surfaces of the optical waveguide member is divided into a first top layer and a first bottom layer, the first top layer and first bottom layer act as one pair of the electrodes, and the first phase-matching layer conductive.

6. A device as set forth in claim 5, wherein the electro-optic crystal is $Bi_{12}SiO_{20}$, the first phase-matching layer is $In_2O_3$, the second phase-matching layer is SiH and the third phase-matching layer is $SiO_2$.

7. A device as set forth in claim 6, wherein the first phase-matching layer has a thickness of 2600 Å, the second phase-matching layer has a thickness of 1100 Å, the optical waveguide member has a length of 2 cm and a thickness of 60 μm.

8. A device as set forth in claim 4, wherein the electro-optic crystal is $Bi_{12}SiO_{20}$, the first phase-matching layer and the third phase-matching layer are $SiO_2$ and the second phase-matching layer is SiH.

9. A device as set forth in claim 8, wherein the first phase-matching layer has a thickness greater than 1300 Å, the second phase-matching layer has a thickness of 1835 Å, and the third phase-matching layer has a thickness of 940 Å.

10. A device as set forth in claim 4, wherein each of said phase matching layers is divided into top and bottom layers and arranged in pairs, respectively, and wherein at least one pair of top and bottom layers act as one pair of the electrodes, at least one other top and bottom layer pair being fixed between the electrodes and the optical waveguide member, respectively, said electrodes being conductive and electrically connected to the optical waveguide member via the at least one other top and bottom layer pair of said phase-matching layers, the at least one other top and bottom layer pair being conductive or having low resistance.

11. A device as set forth in claim 3, wherein the optical waveguide member is a magneto-optic crystal, the first and the third phase-matching layers are $SiO_2$ and the second phase-matching layer is SiH.

12. A device as set forth in claim 11, wherein the first phase-matching layer has a thickness of 1260 Å, the second phase-matching layer has a thickness of 1750 Å, and the optical waveguide member having a length of 2 mm and a thickness of 60 μm.

13. A device as set forth in claim 1, wherein two phase-matching layers are mounted on each of the top and bottom surfaces of the optical waveguide member, a first phase-matching layer mounted on the top and bottom surfaces of the optical wave guide member and a second phase-matching layer mounted on the first phase-matching layer having refractive indexes n1 and n2, respectively, said indexes satisfying the condition that n2<n0<n1, where n0 denoting the refractive index of the optical waveguide member.

14. A device as set forth in claim 13, wherein the optical waveguide member is selected from the group consisting of glass, electro-optic crystal and a magneto-optic crystal.

15. A device as set forth in claim 14, wherein said device has a magnetic field of 100 Oersted applied thereto, the optical waveguide member has a length of 2 mm, and a thickness of 60 μm, and said light has a wavelength of 1.3 μm.

16. A device as set forth in claim 1, wherein one phase-matching layer is mounted on each of the top and bottom surfaces of the optical waveguide member, each phase-matching layer having a refractive index n2, said device having a relative refractive index $n21_s$ for the first polarized light component larger than a relative refractive index $n21_p$ for the second polarized light component, where $$n21_s = \frac{n1_s}{n2} \text{ and } n21_p = \frac{n1_p}{n2},$$

$n1_s$ being the refractive index of the optical waveguide member for the second polarized component of said light to be processed, $n1_p$ being the refractive index of the optical waveguide member for the first polarized component of said light to be processed.

17. A device as set forth in claim 16, wherein the optical waveguide member is selected from the group consisting of glass, an electro-optic crystal and a magneto-optic crystal.

18. A device as set forth in claim 1, 16, 13 or 2, wherein the first phase-matching layer is $SnO_2$.

19. A device as set forth in claim 1, 16, 13 or 2, wherein the optical waveguide member is ZnTe.

20. A device as set forth in claim 1, 16, 13 or 2, wherein the optical waveguide member is an isotropic material.

21. A device as set forth in claim 1, 16, 13 or 2, wherein the optical waveguide member is an anisotropic material.

* * * * *

UNITED STATES PATENT AND TRADEMARK OFFICE
CERTIFICATE OF CORRECTION

PATENT NO. : 4,387,953

DATED : June 14, 1983

INVENTOR(S) : Masataka Shirasaki et al

It is certified that error appears in the above-identified patent and that said Letters Patent is hereby corrected as shown below:

Column 1, line 8, "an" should be --a--.

Column 2, line 61, "Fig. 16" should begin a new paragraph.

Column 3, lines 35-36, delete "toward the output surface of the member".

Column 4, equation (1), all "$\rho$" should be --$\psi$--;

line 55, change "stands" to --exists--.

Column 5, in equation (2), "$\sin\psi$" should be --$\sin\emptyset$--;

line 7, "$\psi$" should be --$\emptyset$--;

line 10, "$\psi$", first occurrence, should be --$\emptyset$--;

line 17, "$\pi/2-\psi<<$," should be --$\pi/2-\emptyset<<1$--;

line 19, "$\psi$", third occurrence, should be --$\emptyset$--;

line 29, "shaft" should be --shift--;

line 31, "$\psi\div$" should be --$\emptyset\div$--;

UNITED STATES PATENT AND TRADEMARK OFFICE
CERTIFICATE OF CORRECTION

PATENT NO. : 4,387,953  Page 2 of 3
DATED : June 14, 1983
INVENTOR(S) : Masataka Shirasaki et al It is certified that error appears in the above-identified patent and that said Letters Patent is hereby corrected as shown below:

line 32, "exist" should be --exists--;

equation (4), change "sin $\varphi$" to --sin($\emptyset$--, both occurrences;

equation (4), change "tan($\varphi$" to --tan($\emptyset$--, both occurrences;

line 44, "$\varphi$" should be --$\emptyset$--;

line 48, "$\varphi$" should be --$\emptyset$--;

equation (5), "$\approx$" should be --$\doteq$--, both occurrences.

Column 6, equation (9), "$\approx$" should be --$\doteq$--;

line 68, "rejects" should be --results--.

Column 7, line 48, ";" should be --,--;

line 62, "it's" should be --its--.

Column 8, line 61, "(Oerded)" should be --(Oersted)--.

UNITED STATES PATENT AND TRADEMARK OFFICE
CERTIFICATE OF CORRECTION

PATENT NO. : 4,387,953

DATED : June 14, 1983

INVENTOR(S) : Masataka Shirasaki et al

It is certified that error appears in the above-identified patent and that said Letters Patent is hereby corrected as shown below:

Column 10, line 31, "bein" should be --being--.

Column 11, line 57, replace "and" with a comma (,).

after "144", insert --and--.

Column 12, line 57, "A" should be --$\overset{\circ}{A}$--;

line 58, "A" should be --$\overset{\circ}{A}$--.

Signed and Sealed this

*Twenty-fifth* Day of *December 1984*

[SEAL]

*Attest:*

*Attesting Officer*

GERALD J. MOSSINGHOFF

*Commissioner of Patents and Trademarks*